(12) United States Patent
Gruber et al.

(10) Patent No.: US 11,555,905 B2
(45) Date of Patent: Jan. 17, 2023

(54) LIGHT DETECTION AND RANGING SYSTEM AND METHOD FOR OPERATING AND TESTING A LIGHT DETECTION AND RANGING SYSTEM, PARTICULARLY FOR SAFETY RELEVANT APPLICATIONS

(71) Applicant: Integrated Device Technology, Inc., San Jose, CA (US)

(72) Inventors: Dominik Gruber, Munich (DE); Giuseppe Tavano, Munich (DE); Serge Di Matteo, Biassono (IT)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 563 days.

(21) Appl. No.: 16/592,037

(22) Filed: Oct. 3, 2019

(65) Prior Publication Data
US 2020/0116840 A1  Apr. 16, 2020

(30) Foreign Application Priority Data

Oct. 15, 2018 (EP) .................................... 18200519
Dec. 10, 2018 (EP) .................................... 18211335

(51) Int. Cl.
*G01S 7/497* (2006.01)
*G01S 17/04* (2020.01)
*G01S 7/481* (2006.01)

(52) U.S. Cl.
CPC ............ *G01S 7/497* (2013.01); *G01S 7/4815* (2013.01); *G01S 17/04* (2020.01)

(58) Field of Classification Search
CPC ........ G01S 7/497; G01S 7/4815; G01S 17/04; G01S 17/08
See application file for complete search history.

(56) References Cited

U.S. PATENT DOCUMENTS 5,627,636 A * 5/1997 Nishino .................. G01S 7/497
                                                        356/5.01
5,926,263 A * 7/1999 Lynch .................. H04B 10/035
                                                        356/73.1
2015/0285912 A1 10/2015 Hammes

OTHER PUBLICATIONS

European Communication, dated Jun. 14, 2019, with European Search Report dated Jun. 5, 2019, from European Patent Application No. 18211335.7.

* cited by examiner

*Primary Examiner* — Jennifer D Bennett
(74) *Attorney, Agent, or Firm* — Haynes and Boone, LLP

(57) ABSTRACT

A light detection and ranging system is disclosed. The system includes a first light source for sending a light signal and a photo detector for receiving a light signal from the surroundings of the system. A signal processing unit receives and processes the light signal to detect objects in the surroundings of the system. A control unit controls, particularly synchronizing, the first light source, the photo detector and/or the signal processing unit. The system further includes a test unit for testing the photo detector and the signal processing unit. The test unit a second light source for sending a test light signal within the system to the photo detector.

11 Claims, 2 Drawing Sheets

LIGHT DETECTION AND RANGING SYSTEM AND METHOD FOR OPERATING AND TESTING A LIGHT DETECTION AND RANGING SYSTEM, PARTICULARLY FOR SAFETY RELEVANT APPLICATIONS

PRIORITY APPLICATIONS

This application claims priority to European Patent Application No. 18200519.9, filed on Oct. 15, 2018, and European Patent Application No. 18211335.7, filed on Dec. 10, 2018.

TECHNICAL FIELD

Embodiments of the invention are directed to a light detection and ranging system, particularly for safety relevant applications and, in particular, relates to a method for operating and testing a light detection and ranging system, particularly for safety relevant applications.

DISCUSSION OF RELATED ART

Light detection and ranging systems (Lidar, LIDAR, LiDAR), also referred to as laser detection and ranging system (Ladar, LADAR, LaDAR) are used to measure the distance to one or more objects in the surroundings of the Lidar system. The system measures the distance to an object by emitting e.g. a pulsed laser, which illuminates objects in the surroundings of the Lidar system. The illuminated object reflects the laser pulses and the Lidar system measures these reflected laser pulses. Differences in the return times and wavelength can then be used to calculate a 3-D representation of the target. Lidar is sometimes called 3D laser scanning, a special combination of 3D scanning and laser scanning. Lidar systems are used in terrestrial, airborne and mobile applications.

In general, a light detection and ranging system comprises a light source, like for example a laser diode, an optical detector, like for example a photo diode, and a signal processor, for processing the signals of the photo detector. Usually the emitting of the light signal by the light source and the detection of the reflected light signals by the photo detector is controlled by a control unit of the light detection and ranging system. If any element of the light detection and ranging system, including the signal paths between different components of the systems, is damaged or operating in a non-intended operating condition, false objects could be detected or real objects could stay undetected. In functional safety relevant applications, like automobile applications (see e.g. ISO 26262) and in particular for controlling and navigating autonomous cars, such system malfunctions are not acceptable. Thus, the proper operation of the light detection and ranging system must be regularly and continuously tested, preferably multiple times per second.

Therefore, there is a need for better operating light detection and ranging systems.

SUMMARY

It is therefore an object of the present invention to provide a light detection and ranging system and a method for operating and testing a light detection and ranging system which checks the proper operation at least of the receiving circuit of the system, preferably of the complete system, regularly and continuously.

This object is solved according to embodiments of the invention by a light detection and ranging system, particularly for safety relevant applications comprising: at least one first light source for sending a light signal to the surroundings of the light detection and ranging system; at least one photo detector for receiving a light signal from the surroundings of the light detection and ranging system; at least one signal processing unit for receiving and processing the signal of the at least one photo detector for detecting objects in the surroundings of the light detection and ranging system; at least one control unit for controlling, particularly synchronizing, the at least one light source, the at least one photo detector and/or the at least one signal processing unit, wherein the light detection and ranging system further comprises a test unit for testing the at least one photo detector and the at least one signal processing unit, wherein the test unit comprises a second light source for sending a test light signal within the light detection and ranging system to the at least one photo detector.

The test unit of the light detection and ranging system according to some embodiments of the invention comprises a second light source, which is arranged internally of the light detection and ranging system. Thus, the light emitted from the second light source is send within the light detection and ranging system to the photo detector. At times where the first light source is not sending a light signal to the surroundings of the light detection and ranging system and thus no reflected light signal is expected, the second light source can send a light signal within the light detection and ranging system to the photo detector, wherein this light signal of the second light source is used for testing the photo detector and the at least one signal processing unit. The signal of the second light source is received by the photo detector and the signals of the photo detector are processed by the at least one signal processing unit like any other light signal and signal of the photo detector. The result of the at least one signal processing unit can be compared, e.g. by the test unit or the at least one signal processing unit, with an expected result for the light signal sent by the second light source. In this way the test unit can test the complete receiving circuit, i.e. the photo detector and the at least one signal processing unit. In case of a malfunction of the light detection and ranging system the test unit or the at least one signal processing unit can send an alert to a system using the light detection and ranging system, like for example a vehicle control unit, which can react to the alert by e.g. switching to a backup system, switching off the autonomous driving function, stopping the vehicle, or other measures.

According to an advantageous variant of some embodiments the at least one control unit also controls, particularly synchronizes, the test unit. In this way the sending and receiving of the light signals of the first and/or second light source can be synchronized, so that there is no interference between the light signals of the first and/or second light source.

In a further variant of some embodiments the test unit comprises a test photo detector, which is arranged in such a way that it receives the light signal send by the first light source. By processing the signal of the test photo detector, for example by the at least one signal processing unit, the functioning of the first light source can be tested. Advantageously the test photo detector is arranged at the outlet or outside of the light detection and ranging system.

According to a variant of some embodiments the light detection and ranging system further comprises an emitter optics for sending the light signal of the at least one first light source to the surroundings of the light detection and ranging system, preferably arranged at a light outlet of the light detection and ranging system. Alternatively, or additionally, the light detection and ranging system further comprises a detector optics for receiving the light signal from the surroundings of the light detection and ranging system and directing the received light signal to the at least one photo detector. Preferably the detector optics are arranged at a light inlet of the light detection and ranging system. The emitter and/or detector optics are used for directing and/or bundling light signals.

Advantageously the detector optics have two operating states, a first light transmitting operating state a second light reflective operating state. In the first operating state light is transmitted from the outside of the light detection and ranging system through the detector optics to the at least one photo detector and in the second operating state the light outside of the light detection and ranging system is reflected by the detector optics, so that no light is transmitted through the detector optics to the at least one photo detector. Preferably the detector optics are electrically switchable between the two operating states. In this way interference with light from the outside of the light detection and ranging system during testing of the light detection and ranging system can be minimized.

In some embodiments of the invention the second light source of the test unit is located inside of the light detection and ranging system offset of a light inlet opening of the light detection and ranging system. Preferably the second light source is masked from the light inlet opening, so that interference with external light is minimized.

If the light detection and ranging system comprises multiple photodetectors the second light source is arranged in such a way that the light signal of the second light source can be received by all photo detectors.

According to some embodiments of the invention the test unit comprises a test light signal generating unit, for generating specific test light signals designed to test specific functions of the light detection and ranging system. By testing different functions of the light detection and ranging system separately, i.e. by using specific test light signals, the accuracy and reliability of the testing is enhanced. For example, the test light signal generating unit can, in combination with the second light source, generate test light signals of different waveforms and/or wavelength.

In some embodiments of the invention the test unit is connected to the at least one signal processing unit to provide information of the test light signal to the at least one signal processing unit, so that the at least one signal processing unit can compare the received test light signal with the test light signal sent by the second light source of the test unit or with a pre-determined test light signal profile. Alternatively, the at least one signal processing unit sends the results of the at least one signal processing additionally to the test unit and the test unit can compare the received light signal with the test light signal send by the second light source of the test unit or with a pre-determined test light signal profile. In case the second light source has not send any light signals the test unit can simply ignore the signals of the at least one signal processing unit.

According to some embodiments of the invention the at least one signal processing unit processes the received test light signal and uses the result to compensate interferences. Thus, the light detection and ranging system can be continuously calibrated to compensate slight changes in the light signal receiving, e.g. due to temperature changes, environmental disturbances, and so on.

The at least one signal processing unit, the at least one control unit and/or the test unit, especially the light signal generating unit, can be implemented by one central processing unit, particularly by different software modules running on the central processing unit. In general, all functions of the light detection and ranging system implemented on a central processing unit can share a common central processing unit or be implemented on different central processing units.

The above object is further solved according to some embodiments of the invention by a method for operating and testing a light detection and ranging system, particularly for safety relevant applications, comprising alternating operating and testing cycles. The operating cycle comprises sending a light signal from at least one first light source to the surroundings of the light detection and ranging system; receiving a light signal from the surroundings of the light detection and ranging system by at least one photo detector; processing the signal of the at least one photo detector for detecting objects in the surroundings of the light detection and ranging system by a signal processing unit; controlling, particularly synchronizing, the sending of the light signal and receiving of the light signal by a control unit, wherein the testing cycle comprises sending a test light signal within the light detection and ranging system to the at least one photo detector by a second light source of a test unit; receiving the test light signal from the second light source of the test unit by the at least one photo detector; processing the signal of the at least one photo detector by the signal processing unit; and comparing the signal of the signal processing unit with an expected signal based on the test light signal for testing the light detection and ranging system.

According to some embodiments of the invention the light detection and ranging system is operated in two alternating cycles. In the operating cycle, the light detection and ranging system is operated as known from the prior art to detect objects in the surroundings of the light detection and ranging system. In the testing cycle the operation of the light detection and ranging system is tested. Therefore, a test light signal is sent within the light detection and ranging system to the at least one photo detector. This test light signal is sent by a second light source of a test unit. This test light signal is received by the at least one photo detector, as is a light signal coming from the surroundings of the light detection and ranging system. The signal of the at least one photo detector is processed by the signal processing unit as a light signal coming from the surroundings of the light detection and ranging system is processed. The signal of the signal processing unit, i.e. the result of the comparison, can be compared to an expected signal, wherein the expected signal corresponds to the test light signal sent by the second light source of the test unit.

In some embodiments of the invention the operating cycle further comprises the step of receiving the light signal of the at least one first light source by test photo detector. The test photo detector is arranged so that the light signal of the at least one first light source is directly received by the test photo detector, preferably directly before or directly after leaving the light detection and ranging system. The signal of the test photo detector can be used to test the first light source of the light detection and ranging system.

In some embodiments of the invention the test unit is controlled together, particularly synchronized, with the at least one first light source and/or the photo detector. This controlling can be performed by a common control unit of the light detection and ranging system.

According to some embodiments of the invention the test light signal is generated by a test light signal generating unit, preferably together with the second light source of the test unit. The test light signal generating unit can generate specific signals designed to test specific functions of the light detection and ranging system. In an advantageous variant the test light signal generating, together with the second light source of the test unit, can generate test light signals with different waveforms and/or wavelength.

Advantageously one or more of the following functions is tested during the testing cycle: noise and reference level, dark current; photosensitivity; transient response, bandwidth; amplifier gain and/or data conversion; measurement offset, internal signal propagation delay; data processing up to object detection.

In some embodiments of the invention different functions of the light detection and ranging system are tested during subsequent testing cycles. Thus, the different functions of the light detection and ranging system are tested one after another, to avoid any interferences between testing of different functions.

According to some embodiments of the invention the test unit provides information of the test light signal to the at least one signal processing unit, which can compare the received test light signal of the at least one photo detector with the sent test light signal. Alternatively, the at least one signal processing unit can provide the signals of the at least one photo detector to the test unit, so that the test unit can compare the received test light signal of the at least one photo detector with the sent test light signal.

In some embodiments of the invention the result of the testing cycle is used to calibrate the light detection and ranging system, for example for compensating interferences and/or changes in the light receiving of the light detection and ranging system, e.g. due to temperature changes, environmental disturbances, and so on.

If the light detection and ranging system comprises multiple photo detectors, the test light signal is sent to multiple photo detectors, preferably all photo detectors, of the light detection and ranging system.

According to some embodiments of the invention, during the testing cycle the light inlet opening of the light detection and ranging system is shut for light signals outside of the light detection and ranging system, to avoid any interferences. This can be for example achieved by a detector optics which can be switched between operating states, a first light transmitting operating state a second light reflective operating state. In the first operating state light is transmitted from the outside of the light detection and ranging system through the detector optics to the at least one photo detector and in the second operating state the light outside of the light detection and ranging system is reflected by the detector optics, so that no light is transmitted through the detector optics to the at least one photo detector. Preferably the detector optics are electrically switchable between the two operating states. In this way interference with light from the outside of the light detection and ranging system during testing of the light detection and ranging system can be minimized.

Embodiments of the invention further relate to a light detection ranging system, preferably as disclosed above, which is designed to implement respectively implementing the method described above.

BRIEF DESCRIPTION OF THE FIGURES

In the following, embodiments of the invention will be further explained with respect to embodiments shown in the figures. It shows.

DETAILED DESCRIPTION

Figure 1:
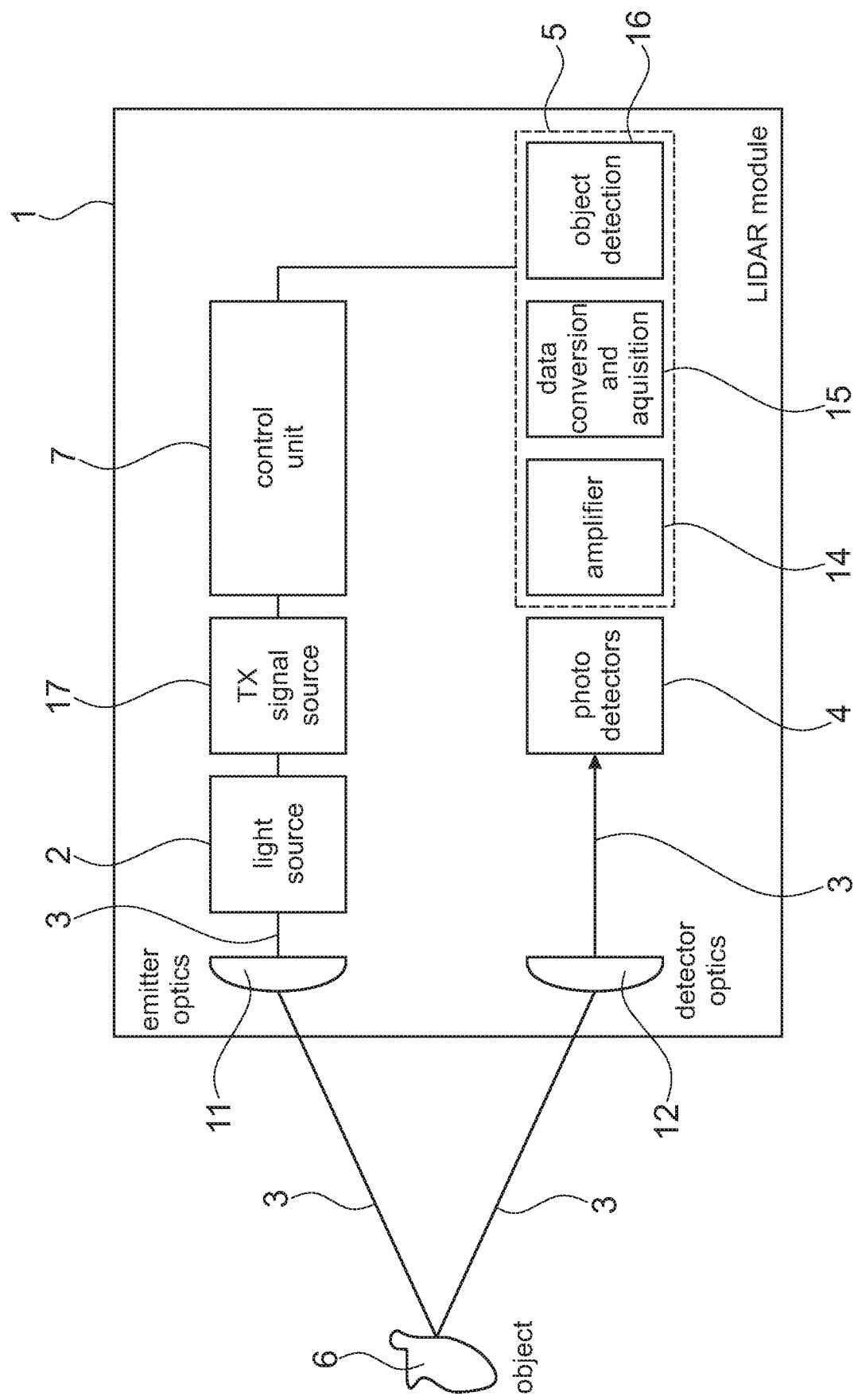
FIG. 1 illustrates a block diagram of a light detection and ranging system according to the prior art.

FIG. 1 shows a block diagram of a light detection and ranging system 1 according to the prior art. The light detection and ranging system 1 comprises a light source 2 sending a light signal 3 to the surroundings of the light detection and ranging system 1, at least one photo detector 4 for receiving a light signal 3 from the surroundings of the light detection and ranging system 1, a signal processing unit 5 for receiving and processing the signal of the at least one photo detector 4 for detecting objects 6 in the surroundings of the light detection and ranging system 1, and a control unit 7 for controlling, particularly synchronizing, the light source 2 and the at least one photo detector 4.

The light detection and ranging system 1 further comprises emitter optics 11 and detector optics 12 for directing and/or bundling light signals 3.

The signal processing unit 5 comprises an amplifier 14 for amplifying the signals of the at least one photo detector 4, a data conversion and acquisition unit 15 for converting the signals of the at least one photo detector 4 to digital signals, and a object detection unit 16 for processing the converted signals of the at least one photo detector 4 for detecting objects 6 in the surroundings of the light detection and ranging system 1.

The control unit 7 can also be connected to the signal processing unit 5 or the control unit 7 and the signal processing unit 5 can be built integrally, for example by a digital signal processor, microcontroller or similar computational device.

During use of the light detection and ranging system 1 the control unit 7 initiates a new object 6 detection by sending a corresponding start signal to a signal source controller 17 that is connected to the light source 2. The light source generates a light signal 3, that is emitted to the surroundings of the light detection and ranging system 1 via the emitter optics 11. In case the light signal 3 impinges on an object 6, at least a part of the light signal 3 is backscattered to the light detection and ranging system 1. This backscattered part of the light signal 3 is directed by the detector optics 12 to at least one photo detector 4. Preferably the light detection and ranging system 1 comprises multiple photo detectors 4. The signal of the at least one photo detector 4 is send the signal processing unit 5. The signal of the at least one detector 4 might be amplified and converted to a digital signal. Finally, the signal processing unit 5 computationally processes the signal of the at least one photo detector 4 to detect objects 6 in the surroundings of the light detection and ranging system 1.

Figure 2:
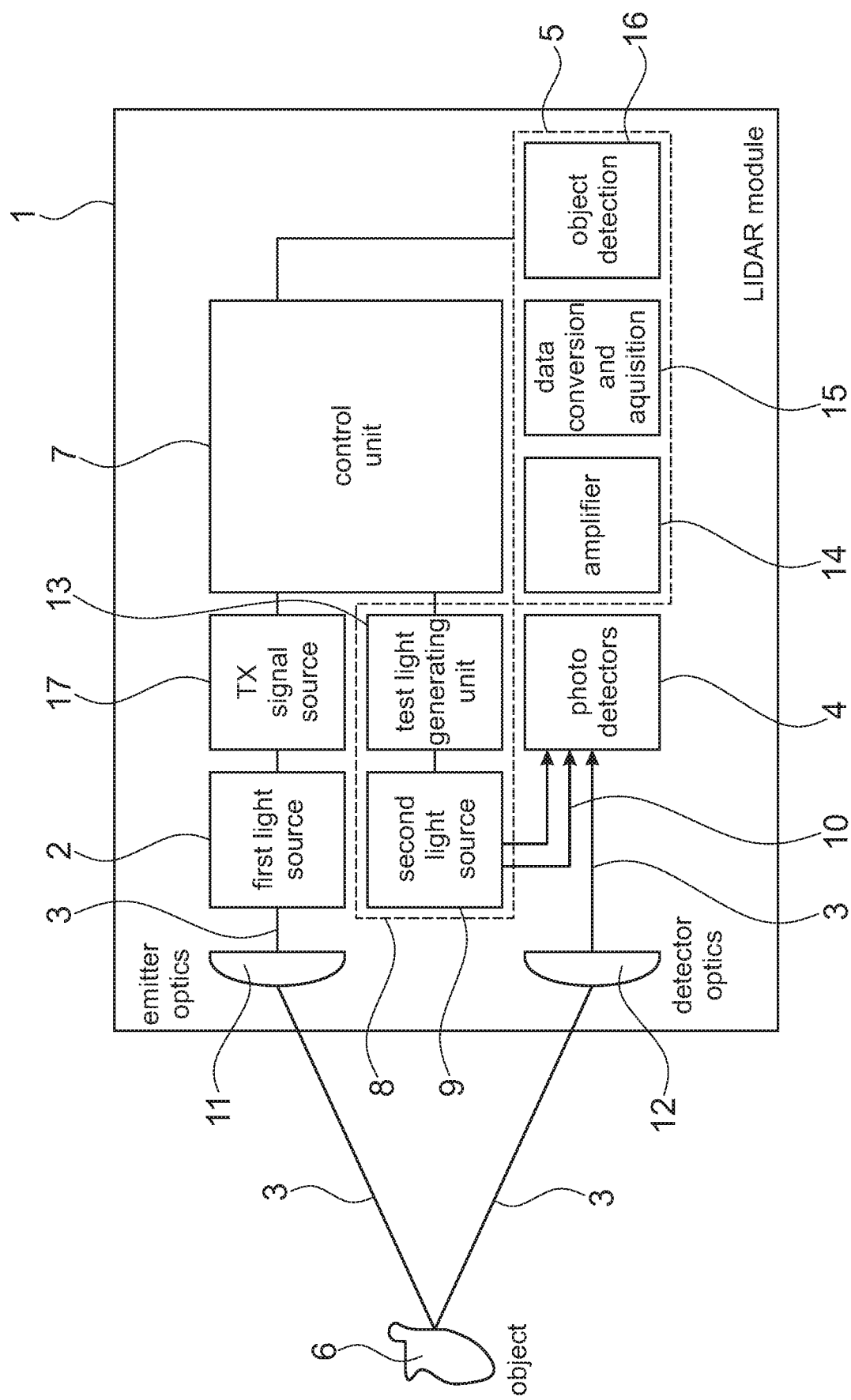
FIG. 2 illustrates a block diagram of a light detection and ranging system according to the invention.

FIG. 2 shows a block diagram of a light detection and ranging system 1 according to the invention. The light detection and ranging system 1 is particularly suitable for safety relevant applications and comprises at least one first light source 2 for sending a light signal 3 to the surroundings of the light detection system 1 and a photo detector 4, for example a photo diode, for receiving a light signal 3 from the surroundings of the light detection and ranging system 1. The light detection and ranging system 1 further comprises at least one signal processing unit for receiving and processing the signal of the at least one photo detector 4 for detecting objects 6 in the surroundings of the light detection and ranging system 1 and a control unit 7 for controlling, Particularly synchronizing, the at least one light source 2, the at least one photo detector 4 and/or the at least one control unit 7.

According to the invention the light detection and ranging system 1 further comprises a test unit 8 for testing the at least one photo detector 4 and the at least one signal processing unit 5. The test unit 8 comprises a second light source 9 for sending a test light signal 10 within the light detection and ranging system 1 to the at least one photo detector 4.

By means of the test light signal 10 the at least one photo detector 4 and the at least one signal processing unit 5 of the light detection and ranging system 1 can be tested.

Preferably the at least one control unit 7 also controls, especially synchronizes, the test unit 8. The controlling and synchronizing of the different components of the light detection and ranging system 1 avoids undesired interferences e.g. between the normal operation of the light detection and ranging system 1 and the test cycle.

The light detection and ranging system 1 can further comprise a test photo detector (not shown) arranged in such a way, that it receives the light signal 3 send by the first light source 2. For example, the second light detector is located inside the light detection and ranging 1 close to an outlet opening for the light signal 3 of the first light source 2 or outside light detection and ranging system close to the outlet opening for the light signal 3 of the first light source 2. By means of the second photo detector the functioning of the first light source 2 can be tested and monitored.

The second light source 9 of the test unit 8 is located inside of the light detection and ranging system 1, preferably offset of a light inlet opening of the light detection and ranging system 1.

The test unit 8 according to FIG. 2 comprises a test light signal generating unit 13, for generating specific test light signals designed to test specific functions of the light detection and ranging system 1. For example, one or more of the following functions are tested during the testing of the light detection and ranging system 1: noise and reference level, dark current; photosensitivity; transient response, bandwidth; amplifier gain and/or data conversion; measurement offset, internal signal propagation delay; data processing up to object detection.

The test unit 8 of the light detection and ranging system 1 according to FIG. 2 is connected to the at least one signal processing unit 5 to provide information of the test light signal 10 to the at least one signal processing unit 5 or to provide the signals of the at least one photo detector 4 after processing by the at least one signal processing unit 5 to the test unit 8, so that the at least one signal processing unit 5 or the test unit 8 can compare the received test light signal 10 after processing by the at least one signal processing unit 5 with test light signal send by the second light source 9 of the test unit 8.

The first light source 2 is controlled by a signal source controller 17, which is connected the control unit 7. The light signal 3 of the first light source 2 is emitted to the surroundings of the light detection and ranging system 1 via an emitter optics 11.

The light signal 3 from the surroundings of the light detection and ranging system 1 is guided to the at least one photo detector 4 by detector optics 12.

The signal processing unit 5 can comprise an amplifier 14, data conversion and acquisition unit 15 and an object detection unit 16.

Such a light detection and ranging system 1 can be used to implement the following method for operating and testing a light detection and ranging system 1, particularly for safety relevant applications, comprising alternating operating and testing cycles, wherein the operating cycle comprises the steps of:

sending the light signal 3 from the at least one first light source 2 to the surroundings of the light detection and ranging system 1;

receiving the light signal 3 from the surroundings of the light detection and ranging system 1 by the at least one photo detector 4;

processing the signal of the at least one photo detector 4 for detecting objects 6 in the surroundings of the light detection and ranging system 1 by the signal processing unit 5;

controlling, particularly synchronizing, the sending of the light signal 3, receiving of the light signal 3 and the processing of the light signal 3 by the control unit 7;

and wherein the testing cycle comprises the steps of:

sending the test light signal 10 within the light detection and ranging system 1 to the at least one photo detector 4 by the second light source 9 of the test unit 8;

receiving the test light signal 10 from the second light source 9 of the test unit 8 by the at least one photo detector 4;

processing the signal of the at least one photo detector (4) by the signal processing unit 5; and comparing the signal of the signal processing unit 5 with an expected signal based on the test light signal 10 for testing the light detection and ranging system 1.

According to the embodiment shown in FIG. 2 the test unit 8 is also controlled, particularly synchronized, with the first light source 2 and the at least one photo detector 4, to minimize interferences between both operating cycles.

The test light signal 10 is generated by a test light signal generating unit 13, which can generate specific test signals 10 designed to test specific functions of the light detection and ranging system 1. Particularly the test light signal generating unit 13 can generate test light signals with different waveforms and/or wavelength.

In a preferred variant during subsequent testing cycles different functions of the light detecting and ranging system 1 are tested. Thus, during each testing cycles only one specific function is tested, e.g. by using a specific test light signal 10. This enhances the accuracy of the testing of the light detection and ranging system 1.

The test unit 8 provides information of the test light signal 10 to the signal processing unit 5. In this way, the signal processing unit 5 can compare during the testing cycle the test light signal 10 received by the at least one photo detector 4 with the test light signal 10 send by the second light source 9. Alternatively, the signal processing unit provides the processed signal of the at least one photo detector 4 to the test unit 8 and the test unit 8 compares this processed signal with the test light signal 10 send by the second light source 9.

The results of the testing cycle can be used to calibrate the light detection and ranging system 1, particularly for compensating interferences and/or changes in the light receiving of the light detection and ranging system 1. However, the main focus is to test the functioning of the light detection and ranging system 1 and issue a warning to other systems or a human user currently using the light detection and ranging system 1.

Different parts of the above disclosed light detection and ranging system 1 can be combined in a single unit, like e.g. the control unit 7 and the signal processing unit 5. Particularly, the different units like the control unit, the test unit and/or the signal processing unit, can be implemented by software units, running on the same or different signal processing devices.

LIST OF NUMERALS 1 light detection and ranging system
2 first light source
3 light signal
4 photo detector
5 signal processing unit
6 object
7 control unit
8 test unit
9 second light source
10 test light signal
11 emitter optics
12 detector optics
13 test light signal generating unit
14 amplifier
15 data conversion and acquisition unit
16 object detection unit
17 signal source controller

What is claimed is:

1. A light detection and ranging system, particularly for safety relevant applications, comprising:
    at least one first light source that sends a source light signal to the surroundings of the light detection and ranging system;
    at least one photo detector that receives a surroundings light signal from the surroundings of the light detection and ranging system;
    at least one signal processing unit for receiving and processing a detector signal of the at least one photo detector for detecting objects in the surroundings of the light detection and ranging system; and
    at least one control unit for controlling, particularly synchronizing, the at least one light source, the at least one photo detector and/or the at least one signal processing unit,
    wherein the light detection and ranging system further comprises a test unit for testing the at least one photo detector and the at least one signal processing unit, wherein the test unit comprises a second light source for sending a test light signal within the light detection and ranging system to the at least one photo detector,
    wherein the test light signal is generated by a test light signal generating unit, the test light signal generating unit configured to generate specific test light signals with different waveforms and wavelengths designed to test specific functions of the light detection and ranging system.

2. The light detection and ranging system according to claim 1, wherein the at least one control unit also controls, particularly synchronizes, the test unit.

3. The light detection and ranging system according to claim 1, further comprising a test photo detector arranged in such a way that it receives the light signal sent by the first light source.

4. The light detection and ranging system according to claim 1, wherein the second light source of the test unit is located inside of the light detection and ranging system offset of a light inlet opening of the light detection and ranging system.

5. The light detection and ranging system according to claim 1, wherein the test unit is connected to the at least one signal processing unit to provide information of the test light signal to the at least one signal processing unit or to provide the detector signals of the at least one photo detector after processing by the at least one signal processing unit to the test unit, so that the at least one signal processing unit or the test unit can compare the test light signal after processing by the at least one signal processing unit with the test light signal sent by the second light source of the test unit.

6. The light detection and ranging system according to claim 1, further comprising emitter optics and/or detector optics for directing and or bundling light signals.

7. A method for operating and testing a light detection and ranging system, comprising alternating operating and testing cycles,
    wherein the operating cycle comprises:
        sending a source light signal from at least one first light source to the surroundings of the light detection and ranging system;
        receiving a surroundings light signal from the surroundings of the light detection and ranging system by at least one photo detector;
        processing a detector signal of the at least one photo detector for detecting objects in the surroundings of the light detection and ranging system by a signal processing unit; and
        controlling, particularly synchronizing, the sending of the source light signal and receiving of the surroundings light signal by a control unit, and
    wherein the testing cycle comprises:
        sending a test light signal within the light detection and ranging system to the at least one photo detector by a second light source of a test unit;
        receiving the test light signal from the second light source of the test unit by the at least one photo detector;
        processing the detector signal of the at least one photo detector by the signal processing unit; and
        comparing the detector signal of the signal processing unit with an expected signal based on the test light signal for testing the light detection and ranging system,
        wherein the test light signal is generated by a test light signal generating unit, the test light signal generating unit configured to generate specific test light signals with different waveforms and wavelengths designed to test specific functions of the light detection and ranging system.

8. The method according to claim 7, wherein the test unit is controlled, particularly synchronized, with the at least one first light source and/or the at least one photo detector.

9. The method according to claim 7, wherein subsequent testing cycles test different functions of the light detection and ranging system.

10. The method according to claim 7, wherein the test unit provides information of the test light signal to the signal processing unit or the signal processing unit provides the processed signal of the at least one photo detector to the test unit.

11. The method according to claim 7, wherein the result of the testing cycle is used to calibrate the light detection and ranging system, particularly for compensating interferences and/or changes in the light receiving of the light detection and ranging system.

* * * * *